(12) United States Patent
Fritz et al.

(10) Patent No.: US 11,411,921 B2
(45) Date of Patent: Aug. 9, 2022

(54) ENABLING ACCESS ACROSS PRIVATE NETWORKS FOR A MANAGED BLOCKCHAIN SERVICE

(71) Applicant: Amazon Technologies, Inc., Seattle, WA (US)

(72) Inventors: Jonathan Andrew Fritz, Seattle, WA (US); Gitesh Tyagi, Seattle, WA (US); Anthony A. Virtuoso, Hawthorne, NJ (US); Turkay Mert Hocanin, New York, NY (US); Nachimuthu Govindasamy, Bothell, WA (US); Ramkumar Kamalapuram Sugavanam, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 659 days.

(21) Appl. No.: 16/199,100

(22) Filed: Nov. 23, 2018

(65) Prior Publication Data

US 2020/0169534 A1 May 28, 2020

(51) Int. Cl.
*H04L 9/40* (2022.01)
*H04L 45/02* (2022.01)
(Continued)

(52) U.S. Cl.
CPC ........ *H04L 63/0272* (2013.01); *H04L 9/0637* (2013.01); *H04L 45/02* (2013.01);
(Continued)

(58) Field of Classification Search
CPC ... H04L 63/0272; H04L 45/02; H04L 45/745; H04L 67/104; H04L 67/1004;
(Continued)

(56) References Cited

U.S. PATENT DOCUMENTS 9,306,949 B1 4/2016 Richard et al.
10,021,196 B1 7/2018 Akers et al.
(Continued)

FOREIGN PATENT DOCUMENTS

CN 107911421 4/2018
CN 108512935 * 9/2018

OTHER PUBLICATIONS

International Search Report and Written Opinion from PCT/US2019/062419, dated Feb. 17, 2020, pp. 1-12.
(Continued)

*Primary Examiner* — Robert B Leung
*Assistant Examiner* — Bruce S Ashley
(74) *Attorney, Agent, or Firm* — Robert C. Kowert; Kowert, Hood, Munyon, Rankin & Goetzel, P.C.

(57) ABSTRACT

Access across private networks may be enabled for blockchain networks in a managed blockchain service. Requests to enable access for a node hosted in a private network to one or more nodes hosted in a different private network that hosts the blockchain network as part of a managed blockchain service may be received. Routes to enable the access may be determined and added to networking devices so that communications between the node in the private network to specified nodes in the private network of the managed blockchain service may be correctly routed.

20 Claims, 13 Drawing Sheets

(51) Int. Cl.
  *H04L 45/745* (2022.01)
  *H04L 67/104* (2022.01)
  *H04L 67/1004* (2022.01)
  *H04L 9/06* (2006.01)
(52) U.S. Cl.
  CPC ............ *H04L 45/745* (2013.01); *H04L 63/10* (2013.01); *H04L 67/1004* (2013.01); *H04L 67/104* (2013.01); *H04L 2209/38* (2013.01)
(58) Field of Classification Search
  CPC ... H04L 9/0637; H04L 63/10; H04L 2209/38; H04L 45/64; H04L 9/3263; H04L 9/3239
  See application file for complete search history.

(56) References Cited

U.S. PATENT DOCUMENTS

| | | | |
|---|---|---|---|
| 10,833,843 | B1 | 11/2020 | Vijayvergia et al. |
| 2010/0257276 | A1* | 10/2010 | Savolainen ........... H04L 69/162 709/230 |
| 2016/0028552 | A1 | 1/2016 | Spanos et al. |
| 2016/0234162 | A1* | 8/2016 | Sabet ................. H04L 61/2015 |
| 2018/0227275 | A1 | 8/2018 | Russinovich et al. |
| 2018/0260125 | A1 | 9/2018 | Botes et al. |
| 2019/0018984 | A1 | 1/2019 | Setty |
| 2019/0026821 | A1 | 1/2019 | Bathen et al. |
| 2019/0166036 | A1* | 5/2019 | Tappin ................ H04L 41/0806 |
| 2019/0236559 | A1 | 8/2019 | Padmanabhan |
| 2019/0268407 | A1 | 8/2019 | Zeng |

OTHER PUBLICATIONS

U.S. Appl. No. 16/199,099, filed Nov. 23, 2018, Jonathan Andrew Fritz et al.

Unknown, "What is Azure Blockchain Workbench?" Sep. 30, 2018, Retrieved from URL: https://docs.microsoft.com/en-us/azure/blockchain/workbench/overview, pp. 1-2.

Unknown, "IBM Blockchain Platform", Nov. 13, 2018, Retrieved from URL: https://console.bluemix.net/docs/services/blockchain/index.html#IBM-blockchain-platform, pp. 1-10.

* cited by examiner

ENABLING ACCESS ACROSS PRIVATE NETWORKS FOR A MANAGED BLOCKCHAIN SERVICE

BACKGROUND

Distributed applications are increasingly distributed beyond the boundaries of individually companies or entities but may instead rely upon a network of cooperating entities in order to operate. Blockchain networks have been developed to facilitate a transparent and consistent way to share and update data that can be examined and trusted by participants. Because blockchain networks involve complex consensus algorithms, storage requirement, and networking implementations, services that can remove the management burden of blockchain networks from participants so that participants can instead focus on application development are highly desirable.

Figure 1:
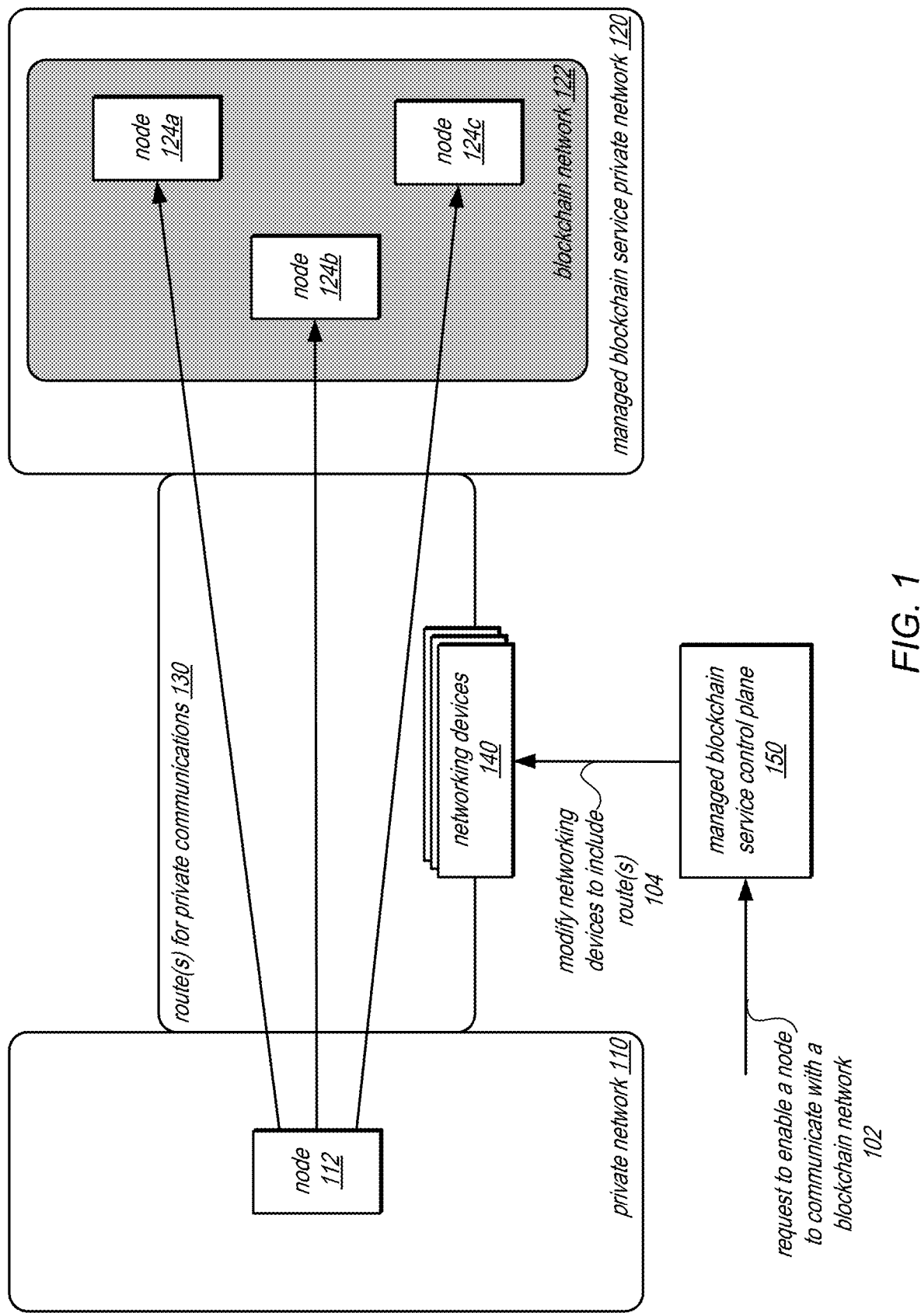
FIG. 1 illustrates a logical block diagram of enabling access across private networks for a managed blockchain service, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of enabling access across private networks for a managed blockchain service are described herein. Blockchain networks offer a wide variety of entities the opportunity to participate in a distributed application that utilizes a blockchain stored and managed by the blockchain network. Given the diversity of entities likely to participate in a blockchain network, networking barriers can arise which can be complex to overcome in order to enable access for differently situated entities participating in the blockchain network. For non-managed blockchain networks, these networking challenges may be overcome using custom solutions, which may involve lots of manual coordination between parties to enable network communication.

Managed blockchain services may implement various physical and/or logical network controls to ensure the privacy of hosted blockchain networks, hosting a blockchain network in a private network (e.g., a logically isolated network such as may be provided by a virtual private network (VPN)) within the managed blockchain service. While resources for participants in a blockchain network hosted within the private network for the blockchain system at the managed blockchain service can easily communicate without crossing network boundaries, participant resources external to the private network of the managed blockchain service may have to cross the private network boundary. Moreover, participant resources may need to direct requests to particularly specified nodes in the blockchain network, a feature not typically supported by managed services for external resources which do not typically provide visibility into the location or number of resources implementing the hosted feature (e.g., blockchain). For example, while some services, such as a database service provide access to specific resources (e.g., database services), managed services may instead implement a load balancer or various other network features that hide the underlying nodes performing work for a client of the service.

Enabling access across private networks for a managed blockchain service may allow for participant resources hosted in other locations (e.g., other private networks) to participate in the blockchain system, increasing the variety of participants that a managed blockchain system can support. Additionally such techniques can allow these participants to implement custom or non-managed participants, instead of moving the resources inside the managed blockchain network's private network which could limit the capabilities of the resources in order to implement the resources as part of a managed environment.

FIG. 1 illustrates a logical block diagram of enabling access across private networks for a managed blockchain service, according to some embodiments. A managed blockchain service may host a blockchain network 122 that includes multiple nodes, such as nodes 124a, 124b, and 124c, in a private network 120. Blockchain network 122 may be implemented according to one of multiple different blockchain frameworks (e.g., a permissionless blockchain framework discussed below with regard to FIG. 4 or a permissioned blockchain framework discussed below with regard to FIG. 5). Blockchain network 122 may have been launched or created by one user account and may also include node(s) 124 created by another user account as participant in the blockchain network for a different entity.

A participant (or potential participant) in the blockchain network may have a resource hosted or otherwise located outside of managed blockchain service private network 120. For example, node 112 may be a node that implements a client application that operates based on data submitted to and received from blockchain network 122 or node 112 could be a peer node that participates with other peer nodes in the blockchain network to determine, accept, or approve updates to the blockchain.

A request 102 may be submitted to a control plane 150 for the managed blockchain service to enable node 112 to communicate with a blockchain network, blockchain network 122, in some embodiments. Control plane 150 may determine route(s) 130 that provide for private communications between node 112 and nodes 124. Moreover, routes 130 may allow node 112 to direct traffic to individual nodes (e.g., send a communication to node 124a) as specified by node 112 (instead of being chosen for node 112 as would happen if a load balancer made the routing decision for the communication). Control plane 150 may then modify networking devices 140 to include the determined route(s) 130. Different types of routes for different types of nodes (and different types of external private networks) may be implemented, as discussed below with regard to FIGS. 4-5 and 9-11. Networking devices 140 may be implemented as physical or virtual networking devices (or some combination thereof), as discussed below.

Please note that the previous description of enabling access across private networks for a managed blockchain service is a logical illustration and thus is not to be construed as limiting as to the implementation of nodes, private networks, a control plane, or networking devices.

This specification begins with a general description of a provider network that implements a managed blockchain service that enables access across private networks. Then various examples of the managed blockchain service (along with other services that may be utilized or implemented) including different components/modules, or arrangements of components/module that may be employed as part of implementing the services are discussed. A number of different methods and techniques to implement enabling access across private networks for a managed blockchain service are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
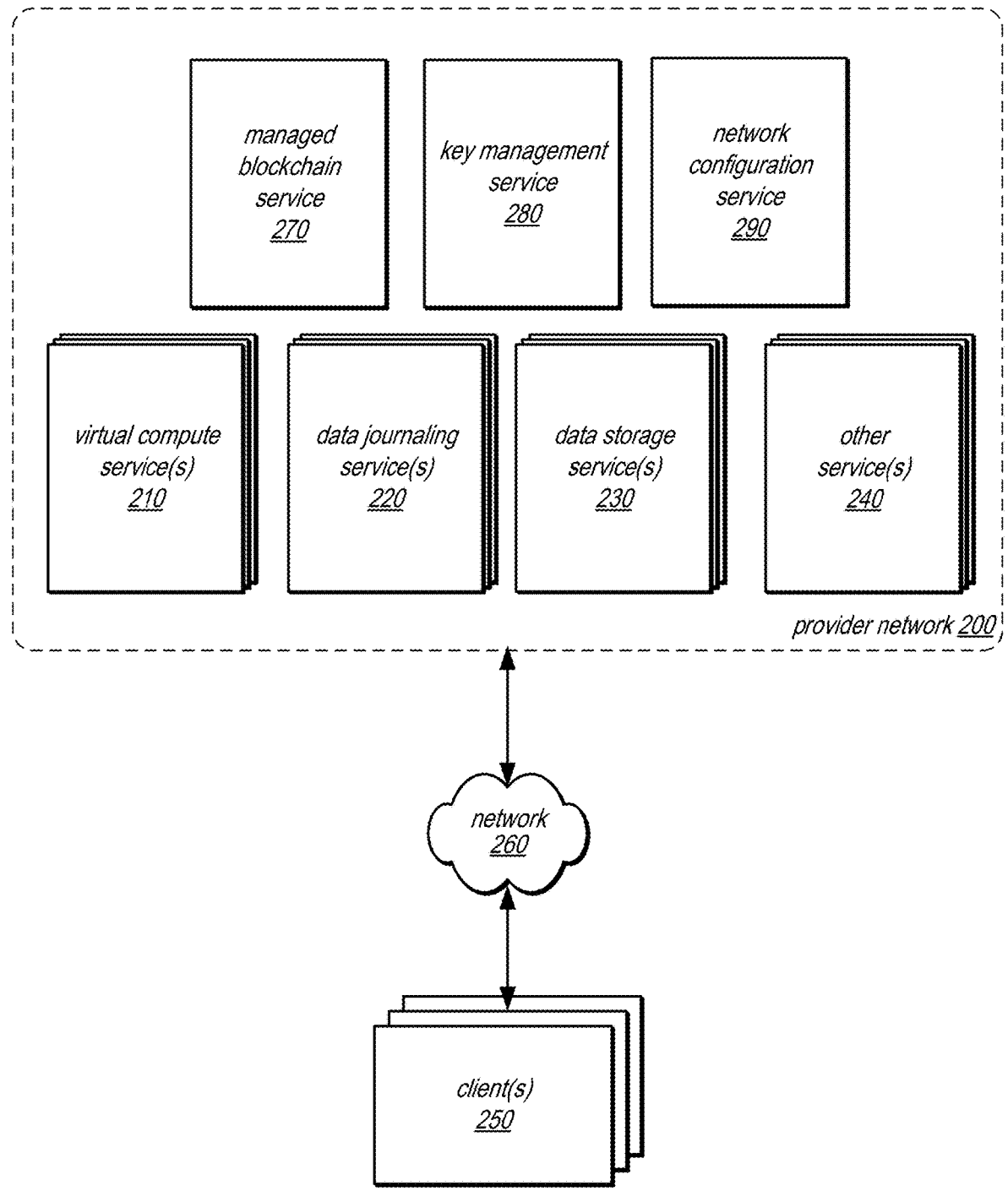
FIG. 2 is a logical block diagram illustrating a managed blockchain service in a provider network, according to some embodiments.

FIG. 2 is a logical block diagram illustrating a managed blockchain service in a provider network, according to some embodiments. Provider network 200 may be a private or closed system or may be set up by an entity such as a company or a public sector organization to provide one or more services (such as various types of cloud-based storage) accessible via the Internet and/or other networks to clients 250, in some embodiments. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 13), needed to implement and distribute the infrastructure and storage services offered by the provider network 200.

In some embodiments, provider network 200 may implement various computing resources or services, such as a virtual compute service(s) 210, data journaling service(s) 220, (e.g.,), data storage service(s) 230, (e.g., relational or non-relational (NoSQL) database query engines, map reduce processing, data flow processing, and/or other large scale data processing techniques, an object storage service, block-based storage service, or data storage service that may store different types of data for centralized access), other services 240 (any other type of network based services (which may include various other types of storage, processing, analysis, communication, event handling, visualization, and security services not illustrated), managed blockchain service 270, key management service 280, and network configuration service 290

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 13 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Virtual compute service(s) 210 may be implemented by provider network 200, in some embodiments. Virtual compute service(s) 210 may offer software container or other operating system virtualized services, such as Docker containers, in some embodiments. In some embodiments, virtual computing service 210 may offer instances and according to various configurations for client(s) 250 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances and of provider network 200 in different embodiments, including general purpose or special purpose computer servers, storage devices, network devices and the like.

In some embodiments instance client(s) 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client(s) 250 applications, without for example requiring the client(s) 250 to access an instance. Applications (or other software operated/implemented by a compute instance and may be specified by client(s), such as custom and/or off-the-shelf software.

In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Data journaling service(s) 220, may include log-based storage and query support databases, data streaming services, or other data storage and processing services that may implement an ordered commit log for storing journal (e.g., log) entries. For example, data journaling service(s) 220 may include may provide strong consistency guarantees and support constraints between committed records, to enable features like deduplication, sequencing, and read-write conflict detection. A log of entries in data journaling service(s) 250 may be used to determine whether or not to commit transactions to a blockchain (e.g., write requests and other modifications) in order to allow to see if a proposed transaction conflicts with other committed transactions. data journaling service(s) 220 may maintain a separate log or chain of log records for blockchain network (or portion of a blockchain network, such as a log maintained per channel of a blockchain), serving as an authoritative definition of the changes to the blockchain over time.

Data storage service(s) 230 may implement different types of data stores for storing, accessing, and managing data on behalf of clients 250 as a network-based service that enables clients 250 to operate a data storage system in a cloud or network computing environment. For example, data storage service(s) 230 may include various types of database storage services (both relational and non-relational) for storing, querying, and updating data. Such services may be enterprise-class database systems that are highly scalable and extensible. Queries may be directed to a database in data storage service(s) 230 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

One data storage service 230 may be implemented as a centralized data store so that other data storage services may access data stored in the centralized data store for processing and or storing within the other data storage services, in some embodiments. A data storage service 230 may provide storage and access to various kinds of object or file data stores for putting, updating, and getting various types, sizes, or collections of data objects or files. Such data storage service(s) 230 may be accessed via programmatic interfaces (e.g., APIs) or graphical user interfaces. A centralized data store may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer systems interface (iSCSI).

In at least some embodiments, one of data storage service(s) 230 may be a data warehouse service that utilizes a centralized data store implemented as part of another data storage service 230. A data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

Managed blockchain service 270, as discussed below in more detail with regard to FIGS. 3-11, may manage the creation and operation of blockchain networks of different frameworks through a common control plane and interface (e.g., API). Key management service 280 may provide centralized encryption key management service to create, import, and rotate encryption keys for encrypting data. Network configuration service 290 may implement various networking features, such as virtual network endpoints, logically isolated networks (e.g., virtual private clouds), network traffic controls, etc.

Generally speaking, clients 250 may encompass any type of client configurable to submit network-based requests to provider network 200 via network 260, including requests for storage services (e.g., a request to create, read, write, obtain, or modify data in data storage service(s) 230, etc.) or managed blockchain service 270 (e.g., a request to create a blockchain network). For example, a given client 250 may include a suitable version of a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment.

Clients 250 may convey network-based services requests (e.g., queries or other access requests directed to data in data storage service(s) 230, operations, tasks, or jobs) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
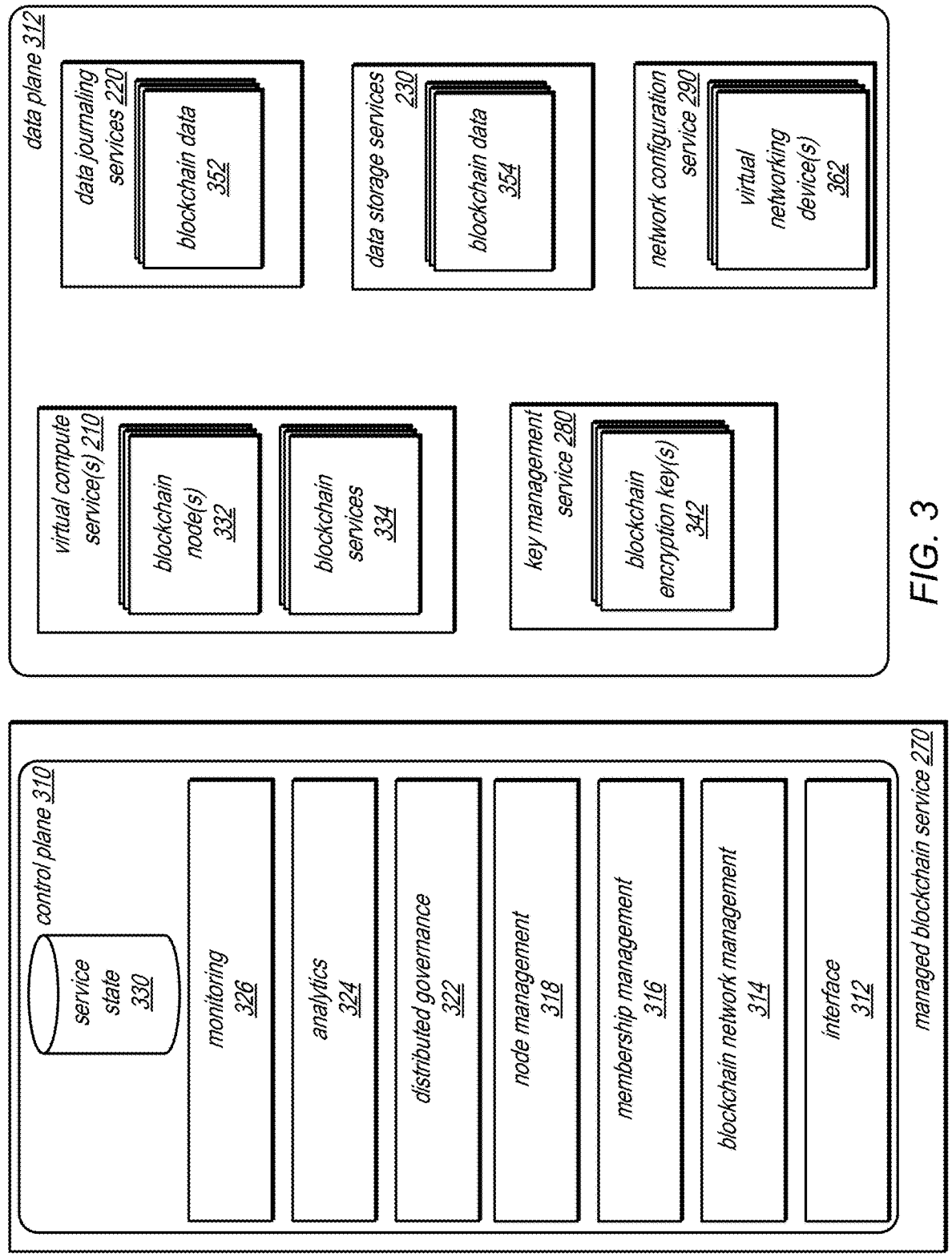
FIG. 3 is a logical block diagram illustrating a managed blockchain service that enables access across private networks for a managed blockchain service, according to some embodiments.

FIG. 3 is a logical block diagram illustrating a managed blockchain service that enables access across private networks for a managed blockchain service, according to some embodiments. Managed blockchain service 270 may implement control plane 310, which may be framework independent as discussed above with regard to FIG. 1. Control plane may include various features to handle the creation, operation, and end of a blockchain network. Control plane 310 may include interface 312. Interface 312 may provide a programmatic interface (e.g., Application Programming Interfaces (APIs)), graphical user interface (GUI) (e.g., as a service console for admins), and/or command line interface for various requests and interactions with different control plane features as discussed below.

Various features of control plane 310 may include blockchain network management 314, which handles blockchain network creation among other requests. For example, a user account of the provider network may submit a request to create a blockchain to be hosted by managed blockchain service 270. The request may specify a blockchain framework, as well as various other blockchain features, including networking features such as whether public network traffic may be allowed, governance features, such as distributed governance policy for adding nodes or members to the blockchain network, among others. Blockchain network management 314 may determine a workflow to identify the nodes or services to deploy, such as blockchain nodes 332 and blockchain services 334 in virtual compute service(s) 210.

Control plane 310 may include membership management 316, which handles membership invitations, among other requests. For example, in order for an entity (e.g., another provider network user account, an external entity, etc.) to be allowed to be a participant in a blockchain network, the entity may be granted membership. Membership management 316 may implement features to send invitations to entities for membership, check whether such invitations are allowed according to a distributed governance policy for the blockchain system, and handle invitation acceptances (or rejections). Membership management 316 may also provide access to membership lists or identify for a user account which blockchain networks the user account is a member of.

Control plane 310 may include node management 318, which handles node creation, among other requests, and discussed in detail below with regard to FIG. 6. For example, entities associated with different user accounts may create, modify, or remove nodes from blockchain networks of which they are a member via different requests handled by node management 318 and may enable network access for the node across private network boundaries.

Control plane 310 may include distributed governance 322, which handles policy evaluations for modifications to a blockchain network, among other requests. For example, distributed governance policies may be implemented to govern actions taken with respect to a blockchain network. A distributed governance policy may describe criteria, including approval/disapproval mechanisms like a voting system, for determining whether a proposed change (e.g., to add a member, node, evict a member or node, to modify blockchain network configuration, hardware, and/or software, a change to a distributed governance policy, etc.). Distributed governance 322 may evaluate a received proposal in order to determine whether the proposal may be allowed. Distributed governance 322 may initiate a vote, sending vote notifications, evaluating received votes, and approving/finalizing vote results in order to evaluate a proposal.

Control plane 310 may include analytics 324, which handles requests to access offline blockchain data, among others. For example, blockchain data (including metadata describing the blockchain, data related to or linked to the blockchain, such as files or other content referenced by the blockchain, and blockchain transactions) may be copied from storage for the blockchain network to another data storage service for performing various analytics operations, including queries and machine learning or other statistical analysis. Analytics feature 324 may manage offline data collection and visibility, allowing individual user accounts to enable or disable data collection, among other configuration options.

Control plane 310 may include monitoring 326, which may monitor for and respond to performance events, in some embodiments. For example, monitoring feature 326 may performed automated management tasks for managed blockchain service 270 according to detected performance events. Performance data may be collected and evaluated with respect to different event criteria in order to determine whether a performance event is triggered. Monitoring feature 326 may determine and/or initiate responsive actions to detected event, including actions to add, remove, or replace nodes within a blockchain network, increase or decrease service resources (e.g., increase or decrease orderer nodes), or modify blockchain network configuration or other features to respond to detected performance events.

Control plane 310 may also store various information as service state 330, which may be implemented as one or many data stores (e.g., different types and styles of databases, or one large data store, such as a large document database for storing service state including blockchain networks state). In this way, the progress of workflows, state or membership of blockchain networks, mapping information or other configuration information, among other data used to implement managed blockchain service 270 can be reliably and accessibly maintained.

Managed blockchain service 270 may control and operate various features in data plane 312. Some or all of data plane 312 may be implemented directly within management blockchain service 270 (not illustrated), in some embodiments. In other embodiments, other provider network services may provide resources that operate in the data plane 312 of managed blockchain service 270. For example, virtual compute service(s) 210 may implement both blockchain node(s) 332 and service(s) 334, data journaling services 220 may implement blockchain data storage 352 (e.g., as an ordered commit log backend for a blockchain), data storage services 230 for tiered or offline blockchain data 354 storage, and key management service 280 for blockchain encryption key(s) 342 for encryption and identity. As discussed in detail below, network configuration service 290 may perform various operations or tasks to configure virtual networking devices 362 on behalf of a blockchain network in order to enable access across private networks.

Figure 4:
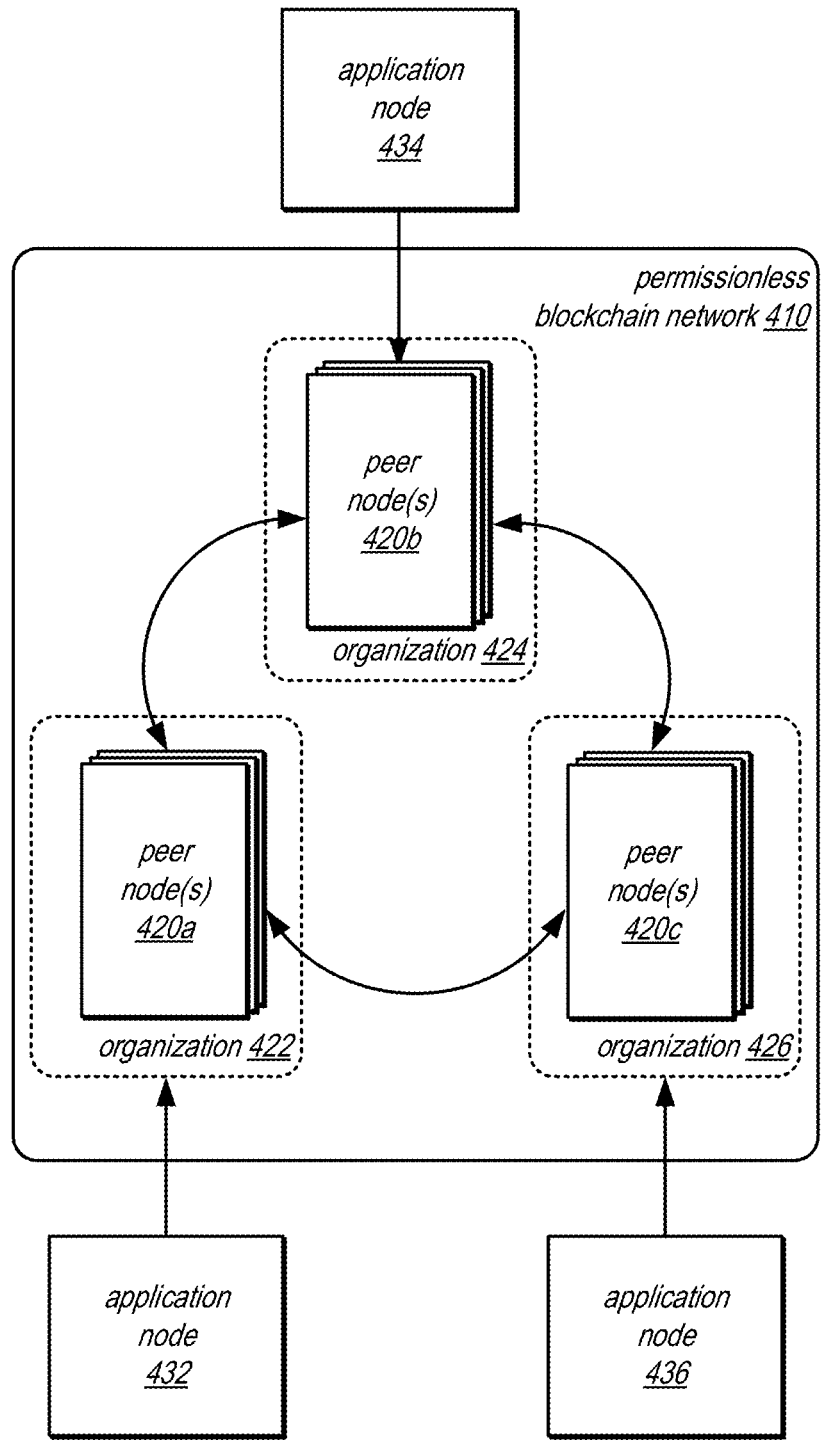
FIG. 4 is a logical block diagram illustrating a permissionless blockchain network framework, according to some embodiments.

FIG. 4 is a logical block diagram illustrating a permissionless blockchain network framework, according to some embodiments. Permissionless blockchain network 410, such as Ethereum, may utilize peer node(s) in one or more organizations, such as peer nodes 420a, 420b, and 420c in organizations 422, 424, and 426 respectively. In such blockchain frameworks, peer nodes 420 may perform the various operations to propose transactions, order transactions, and validate transactions. Because the blockchain network 410 is permissionless, in some scenarios public network access (e.g., to the Internet) may be provided or configured in order to allow external nodes operating on the same blockchain framework to participate in the blockchain network 410. However, in other scenarios, the permissionless blockchain network 410 may remain in a private network without public network access.

Application nodes, such as application node 432, 434, and 436, may access peer node(s) 420 in order to perform various operations to implement a distributed application using one or more Application Programming Interfaces (APIs) implemented for the blockchain network framework. For example, an application node 432 may submit an update to a record processed by an entity that implements application node 432 (e.g., a government agency that provides a government issued identifier or serial number for a product that is being manufactured by another entity). In some embodiments, application nodes may be implemented on a same server or host as the peer node(s) 420 (not illustrated).

Figure 5:
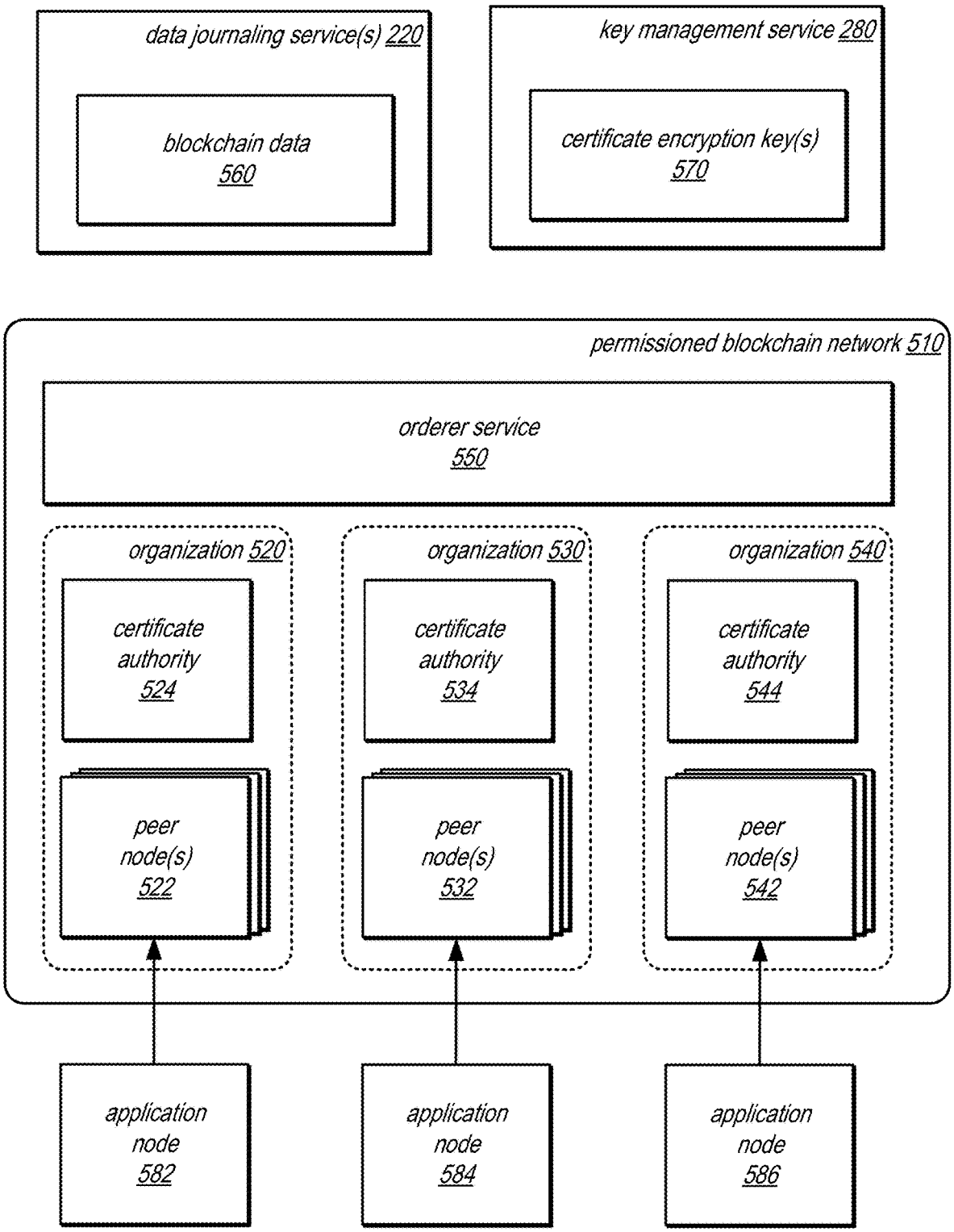
FIG. 5 is a logical block diagram illustrating a permissioned blockchain network framework, according to some embodiments.

FIG. 5 is a logical block diagram illustrating a permissioned blockchain network framework, according to some embodiments. Permissioned blockchain network 510, such as Hyperledger Fabric, allow multiple different organizations that are members of a blockchain network to be setup, like organizations 520, 530, and 540. These organizations may implement one or multiple peer nodes, such as peer node(s) 522, 532, and 542, to execute smart contracts and other blockchain operations. Peer node(s) may make use of an orderer service 550. In some embodiments, an orderer service may be separately allocated service nodes that implement an orderer service for transactions proposed to the blockchain network. In one embodiment, orderer service 550 be a multi-tenant orderer service that receives proposed transactions via a network endpoint for the service from peer node(s) from different organizations and/or blockchain networks.

In some embodiments, orderer service 550 may incorporate a backed commit log service, such as Apache Kafka, in order to provide a commit log for ordered transactions. In other embodiments, orderer service 550 may rely upon another provider network service, which may be a data journal service 220 that can also provide an ordered commit log stored as blockchain data 560 for verifying and committing transactions to the blockchain network. Using an external service may also allow for tiered blockchain data storage. If, for instance, an orderer failed and a new orderer was launched, the orderer may only have to retrieve a set of data maintained in data journaling service that is small (as a result of moving out older blockchain data to other storage service(s) 230, such as an object store and/or another type of database), in some embodiments, significantly reducing recovery time from failures or launching additional orderers.

In some embodiments, organizations may implement certificate authorities to grant certificates to peer nodes in order to sign communications to be trusted within the blockchain network. Certificate authorities, such as certificate authority

524, 534, and 544 could rely upon a stored certificate at the certificate authority in some embodiments to provide other certificates to peer node(s) 522. These certificates that are stored on the certificate authorities could be stored using a hardware security module (HSM) device in a host system. Alternatively, certificate authorities could utilize an encryption key for certificates 570 provided by key management service 280 to decrypt the certificate for providing the other certificates and then discard the decrypted form when finished so as to not store the decrypted version of the certificate.

Application nodes, such as application node 582, 584, and 586, may access peer node(s) 522, 532, and 542 respectively in order to perform various operations to implement a distributed application using one or more Application Programming Interfaces (APIs) implemented for the blockchain network framework. As noted above, in some embodiments, application nodes may be implemented on a same server or host as the peer node(s) 522, 532, or 542 (not illustrated).

Figure 6:
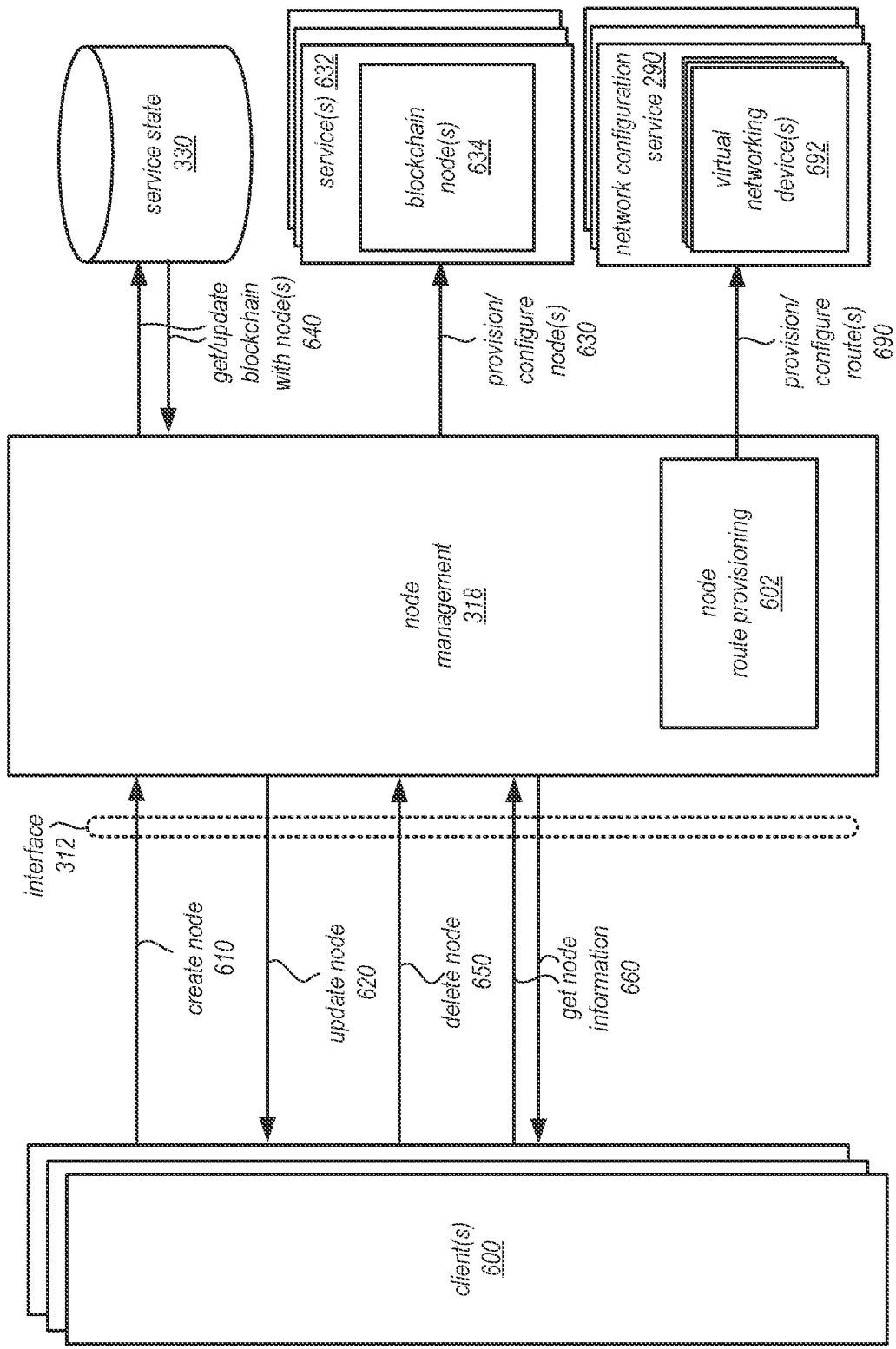
FIG. 6 is a logical block diagram illustrating interactions with a node management feature of a control plane of a managed blockchain service, according to some embodiments.

FIG. 6 is a logical block diagram illustrating interactions with a node management feature of a control plane of a managed blockchain service, according to some embodiments. Client(s) 600 may be external clients (e.g., 250 in FIG. 2) or internal clients of a provider network 200 that are implemented as applications on other services, such as virtual computing service(s) 210. Client(s) 600 may submit a request to create a node 610 associated with a member of a blockchain network via interface 312. Node management 318 may parse the request and perform the appropriate requests to provision the node 630 at the appropriate service(s) 632, such as blockchain node(s) 634. Node management 318 may also update service state 330 to update 640 blockchain network information to reflect the created node(s).

In some embodiments, the creation request 610 may indicate whether the node is to be managed in blockchain management service 270 or managed independent of managed blockchain service 270 (e.g., in another private network of in provider network 200 or external to provider network 200). Node management 318 may implement node route provisioning 602 to provision or configure route(s) 690 for enabling access for a created node according to whether the node is managed independent of managed blockchain service 270 or within managed blockchain service 270. For example, a request 610 to create an application node in another provider network may be received via interface 312. The request may identify the node's location and other identifying information, the corresponding member associated with the node, the node's network configuration (e.g., is located in a logically isolated network of the provider network, an on premise network, in another provider network, etc.), among other information. Node route provisioning 602 may identify routes, networking devices and features, and other tasks to be performed in order to enable access for the requested application node, such as the configuration discussed below with regard to FIG. 7 or 9. In some embodiments, node route provisioning 602 may evaluate validity criteria (e.g., is the member authorized to add a node, does the network configuration allow the node to be given access, etc.). Node route provisioning 602 may request, direct, initiate, or otherwise cause the various requests 690 to provision and/or configure route(s) 690 to be performed at virtual networking devices 692 via configuration service 290.

In another example, a request 610 to create a node may identify that node as a peer node. A peer node may perform different types of communications than an application node and may be visible to other peer nodes. For example, a peer node may perform gossip protocol communications via the enabled access. The request may identify the peer node's location and other identifying information, the corresponding member associated with the node, the node's network configuration (e.g., is located in a logically isolated network of the provider network, an on premise network, in another provider network, etc.), among other information. Node route provisioning 602 may identify routes, networking devices and features, and other tasks to be performed in order to enable access for the requested application node, such as the configuration discussed below with regard to FIG. 8 or FIG. 9. In some embodiments, node route provisioning 602 may evaluate validity criteria (e.g., is the member authorized to add a node, does the network configuration allow the node to be given access, etc.). Node route provisioning 602 may request, direct, initiate, or otherwise cause the various requests 690 to provision and/or configure route(s) 690 to be performed at virtual networking devices 692 via configuration service 290.

In some embodiments, configuring and/or provisioning routes to enable access across private networks may be performed when a new member is created for the blockchain network. For example, the member may be asked to identify a location and network configuration of areas in which resources that may access the blockchain network could be hosted (e.g., on premise network configuration, private network within provider network 200, etc.) which may initiate a workflow or operation to provision routes between the network areas from which nodes may be subsequently created. Thus, in some embodiments, enabling network access from one private network to the private network of the managed blockchain service may be performed before any nodes are created.

Similarly, update node requests 620 (e.g., to change node configuration, change node size or resource allocation, etc.) may be sent via interface 312. Node management 318 may perform similar configuration operations 630 to blockchain node(s) 634, including instructing a management agent (not illustrated) to perform one or more operations to affect the update, in some embodiments. Updates to service state 640 to indicate the updates to the nodes of the blockchain network may be made.

Similarly, delete node requests 650 to stop, halt, or otherwise remove a node may be sent via interface 312. Node management 318 may perform similar configuration operations 630 to blockchain node(s) 634, including instructing a management agent (not illustrated) to stop performance and or a request to service(s) 620 to shut down one of blockchain node(s) 634. Again, updates to service state 640 to indicate the updates to the nodes of the blockchain network may be made.

Node management 318 may also handle requests to describe nodes, like get node information request 660. Node management 318 may retrieve configuration information of the node 640 from service state and use the retrieved information to return a result to request 660. Performance metrics or other health information could be combined or included with node information, in some embodiments.

Figure 7:
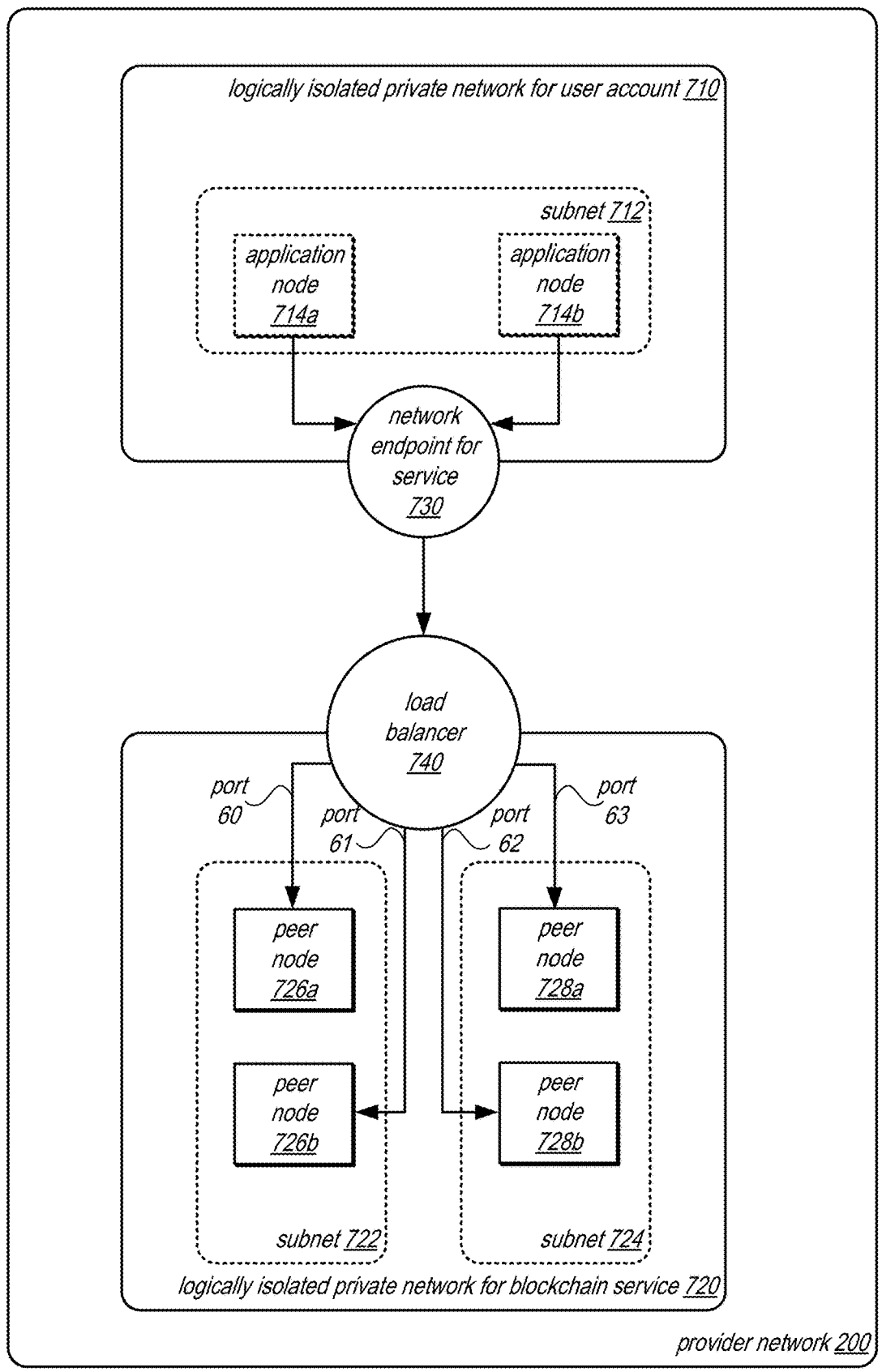
FIG. 7 is a logical block diagram of enabling access for a node implementing a client application for a blockchain, according to some embodiments.

Various different techniques for enabling access for an application node may be performed responsive to a request to enable access for a node to a private network of blockchain managed service. FIG. 7 is a logical block diagram of enabling access for a node implementing a client application for a blockchain, according to some embodiments. As illustrated in FIG. 7, application nodes 714a and 714b may have access enabled from subnet 712 within logically isolated private network for a user account of the provider network 710 to logically isolated private network for blockchain service 720, both of which are located within provider network 200. A network endpoint for the blockchain service 730 may be created, instantiated, or otherwise implemented within network 710 that points network traffic directed to endpoint 730 to a load balancer 740 for network 720 that handles requests to the blockchain service network 720. Because application nodes 714 direct requests to network endpoint for service 730, the network endpoint for service 730 and load balancer 740 may resolve any unknown domain name service (DNS) errors automatically, without having to update a private DNS for logically isolated private network for user account 710.

In some embodiments, node route provisioning 602 or other component of control plane 310 may request an operator for user network 710 to send a request to network configuration service 290 to create endpoint 740 to be pointed to load balancer 740. In other embodiments, node route provisioning 602 or other component of control plane 310 may perform the request automatically (as authorization to do so may be included in the request to enable node access). Various other features, such as security groups, firewalls, access control lists, or other network management features of user network 710 may be configured to allow and/or direct communications to network endpoint 730 that are bound for nodes in service network 720.

In some embodiments, node route provisioning 602 or other component of control plane 310 may request the creation and/or configuration of load balancer 740 (which may be a physical load balancer or virtual load balancer) to listen for and accept traffic directed to network endpoint 730. For example, one or more routes between a networking device implementing network endpoint 730 and load balancer 740 may be updated to include a route that forwards network traffic to load balancer 740. These networking devices may be internal to provider network 200, preserving the privacy of the communications sent to network endpoint 730. Load balancer 740 may also be modified to listen for traffic directed to individual nodes on different ports, in some embodiments. In this way, application nodes 714 can send a communication to a particular peer node (e.g., one of 726a, 726b in subnet 722, or one of peer nodes 728a or 728b in subnet 724) by specifying the port (e.g., port 60 for peer node 726a, port 61 for peer node 726b, port 62 for peer node 728a, and port 63 for peer node 728b). The port mappings may be provided to the user account 710 (e.g., as replacement for a node discovery communication sent via an API for the framework of the blockchain network).

Figure 8:
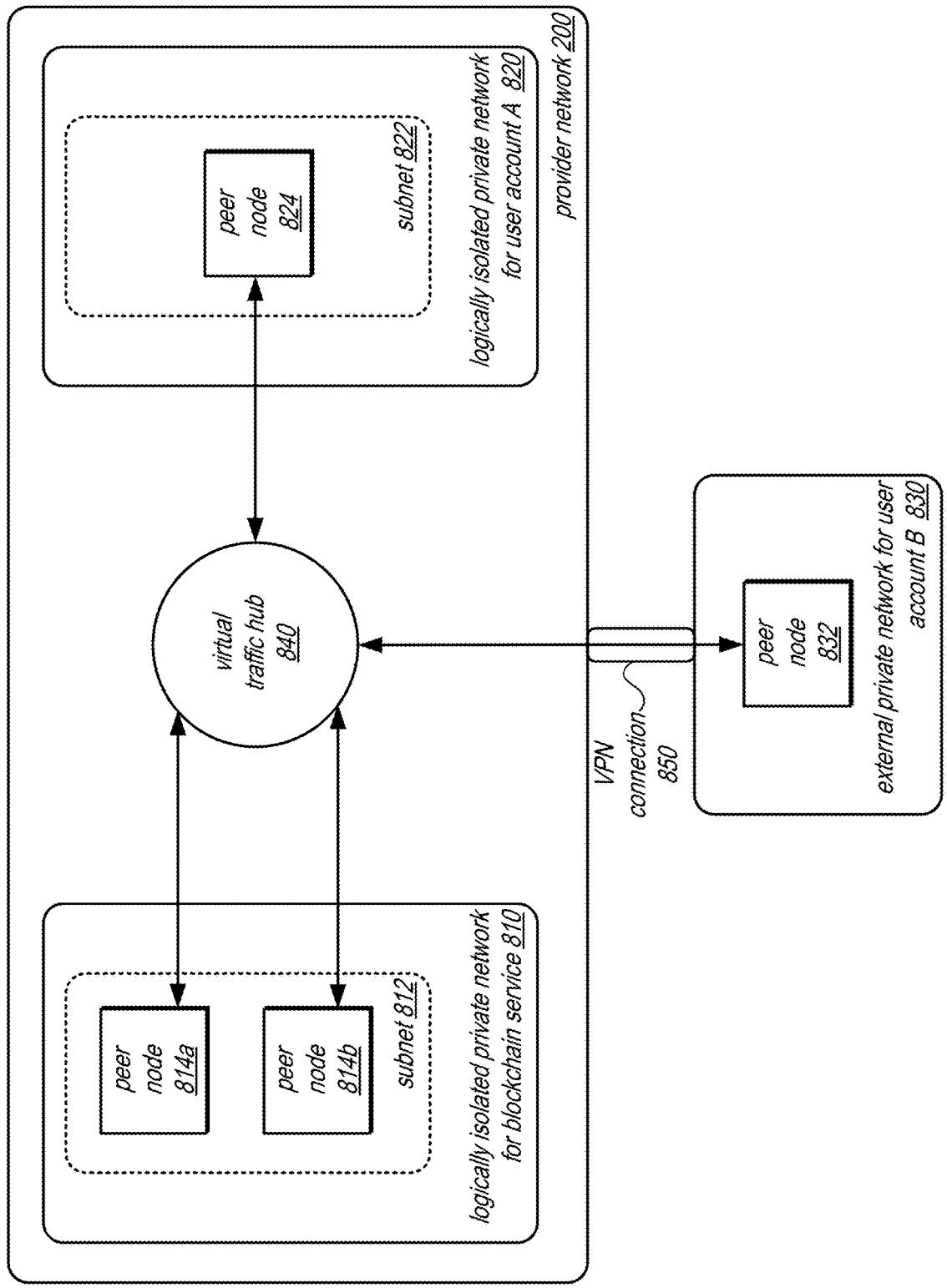
FIG. 8 is a logical block diagram of enabling access for a peer node in a private network outside of the private network of the managed blockchain service, according to some embodiments.

FIG. 8 is a logical block diagram of enabling access for a peer node in a private network outside of the private network of the managed blockchain service, according to some embodiments. As illustrated in FIG. 8, peer node 824 may have access enabled from subnet 822 within logically isolated private network for a user account A of the provider network 822 to logically isolated private network for blockchain service 810, both of which are located within provider network 200. Also illustrated in FIG. 8, peer node 832 may have access enabled within external private network for user account B of the provider network 830 via a private connection 850 (e.g., a virtual private connection (VPN) to provider network 200. In some embodiments, the VPN connection 850 may be implemented over a dedicated physical connection between provider network 200 and external private network 830 or over a public network connection utilizing VPN 850 alone. Although not illustrated, similar techniques using a VPN could be implemented for a peer node implemented in another provider network separate from provider network 200 (e.g., owned or operated by a different entity).

In some embodiments, node route provisioning 602 or other component of control plane 310 may request the creation and/or configuration of a virtual traffic hub 840 from networking service 290. In some embodiments, virtual traffic hub 840 may be implemented using a multi-layer packet processing service (PPS) of multiple logically isolated cells that may be used as the underlying framework for the virtual traffic hub. Virtual traffic hub 840 may serve as a hub set up on behalf of respective systems of provider network 200, such as managed blockchain service 290, to which several different types of private networks (e.g., networks 820 and 830) may be programmatically attached in a hub-and-spoke configuration in various embodiments, such that the routing/forwarding of network packets from one attached isolated network to another is managed by nodes of a virtual traffic hub 840 based on metadata and/or policies provided by the creating/using clients, applications, entities, and/or systems. Virtual traffic hub 840 may also be referred to as a transit gateway in some embodiments.

The private networks attached to virtual traffic hub 840 may, for example, include logically isolated virtual networks because, for example, at least some network configuration settings (e.g., network addresses assigned to resources within a given network, subnet configurations, security settings and the like) may be set independently for the different networks, without having to take other networks' configuration settings into account. For example, a range of private network addresses selected for resources within one isolated network may happen to overlap with a range of private network addresses selected for resources within another isolated network in various embodiments, since the two address ranges are selected independently. According to some embodiments, the metadata taken into consideration at virtual traffic hub 840 set up on behalf of a given client to manage traffic flowing between various private networks may include multiple route tables provided by the client (and/or route tables generated at the virtual traffic hub 840 based on other input provided by the client, such as forwarding information base (FIB) entries from which route table entries may be derived.) After the appropriate route tables have been associated and populated with entries, traffic may be allowed to start flowing between the private networks via virtual traffic hub 840 in various embodiments.

Virtual traffic hub 840 may allow network traffic (e.g., gossip communications) between peer node 832 and peer node 824, and as well as with peer node 814a and 814b in subnet 812 of service private network 810.

Please note that the techniques described above for FIGS. 7 and 8 can be implemented together, in some embodiments.

Figure 9:
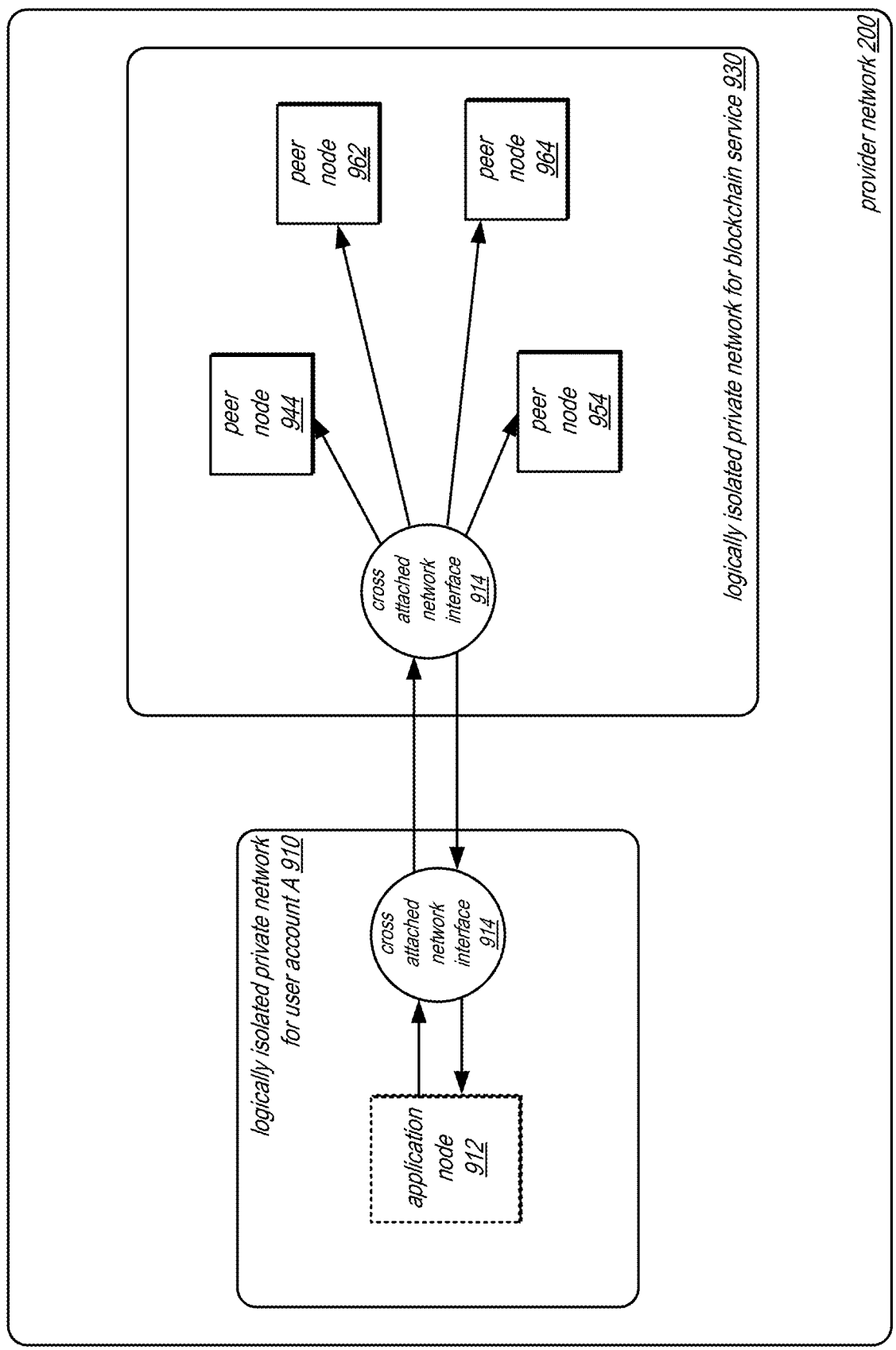
FIG. 9 is a logical block diagram of enabling access for a client application with cross attached network interfaces, according to some embodiments.

Other various types of techniques for enabling access across private networks. FIG. 9 is a logical block diagram of enabling access for a client application with cross attached network interfaces, according to some embodiments. Access for an application node 912 created in logically isolated private network for user account A 910 may be enabled using cross attached network interfaces. A cross attached network interface 914, which may be a logical networking device representing a virtual network card, may be created inside of the private network hosting the blockchain network, such as cross attached network interface 914, but attached to the application node 912.

Attaching a network interface may allow for communications received from and directed to that network interface to behave as if received or sent from the created location, inside of logically isolated private network for blockchain service 930. In this way, the attached application node can send traffic to cross attached network interface 914 which will then be able forward the traffic to nodes inside of logically isolated private network for blockchain service 930 (as the arrows from network interface 914 to peer nodes 944, 954, 962, and 964 show). A cross attached network interface 914 may be implemented using one or more networking devices managed by network configuration service 290 that implement a substrate network for provider network 200. The networking device(s) of the substrate network may be modified to include route(s) that will forward traffic from application node 912 directed to cross attached network interface 914 to the specified peer node as if sent from the virtual network card represented by cross attached network interface inside of private network 930.

Cross attached network interfaces may be created by node route provisioning upon node creation 602, in FIG. 6, in some embodiments. For example, node route provisioning 602 may send requests to network configuration service 290 to create the cross attached network interface within private network 930 and attach the device to application node 912 in private network 910.

Figure 10:
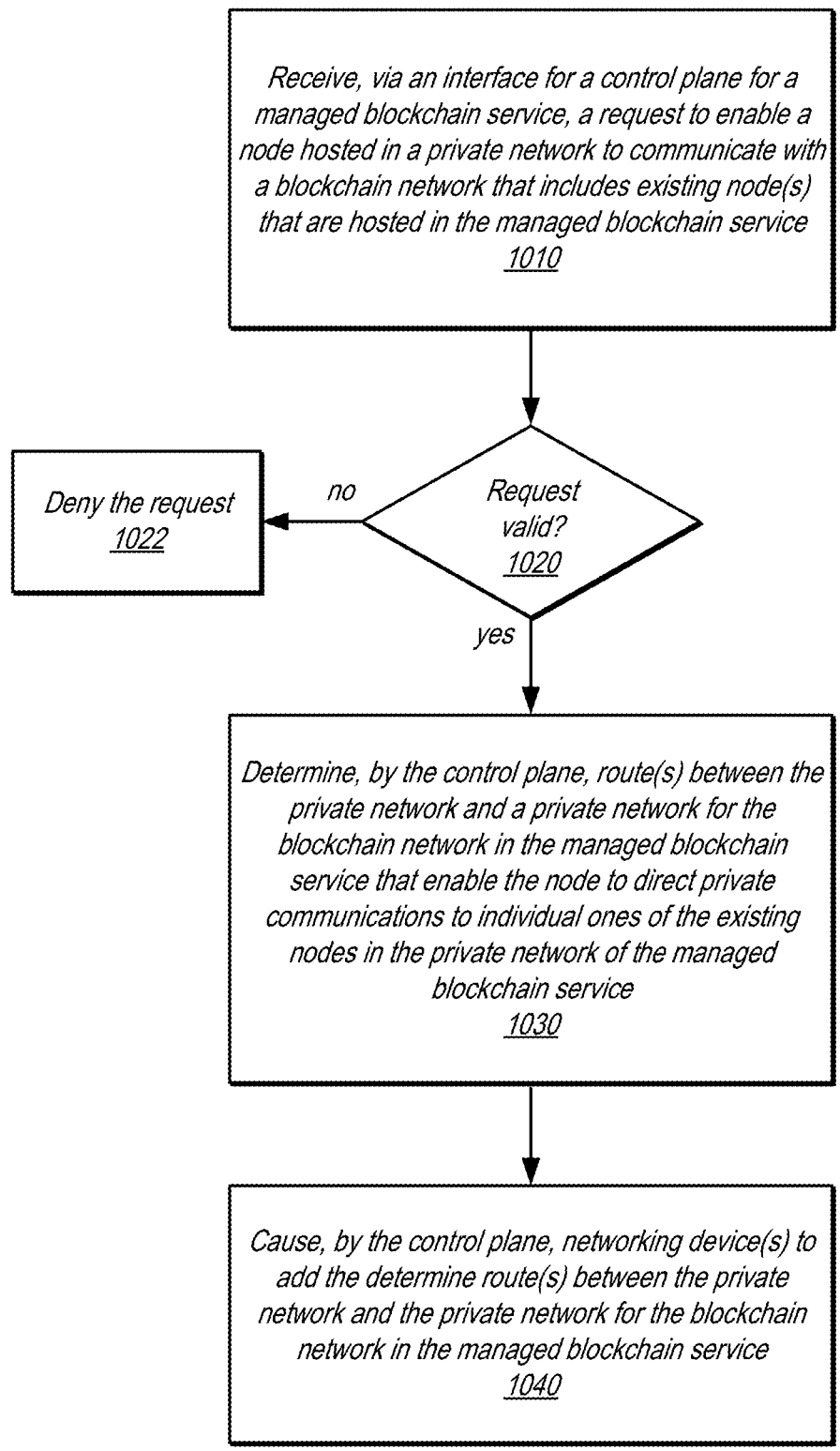
FIG. 10 is a high-level flowchart illustrating various methods and techniques to enable access across private networks for a managed blockchain service, according to some embodiments.

As discussed above with regard to FIGS. 2-9, a managed blockchain service may be implemented as part of a provider network. However, a managed blockchain service could be implemented as a standalone service, which may be a publicly available service, or privately implemented. FIG. 10 is a high-level flowchart illustrating various methods and techniques to enable access across private networks for a managed blockchain service, according to some embodiments. Therefore, the above examples and or any other systems or devices referenced as performing the illustrated method, are not intended to be limiting as to other different components, modules, systems, or configurations of systems and devices.

As indicated at 1010, a request to enable a node hosted in a private network to communicate with a blockchain network that includes existing node(s) that are hosted in a managed blockchain service may be received via an interface for a control plane for the managed blockchain service, in some embodiments. For example the request may identify the blockchain network, a member identifier associated with the request, location and network configuration information for the node, a type of node (e.g., application or peer, or externally managed), or various other information to perform the request. In some embodiments, the request to enable a node may be a request to accept a membership invitation which may include a network for the accepting member so that any node started, launched, or otherwise hosted in the member's network can communicate with the blockchain network in the private network of the managed blockchain service.

As indicated at 1020, a determination may be made as to whether the request is valid, in some embodiments. For example, various criteria may be applied which indicate whether or not the node identified in the request can have access. A private network address (e.g., described by one or more Classless Inter-Domain Routing (CIDR) blocks) may not be able to overlap or match an existing private network address in the managed blockchain service network (or other accessible private networks for the blockchain network). If the network address of the node does match, then the node may not be valid for access. If a request is not valid, then as indicated at 1022, the request may be denied. Instead of denying the request remedial action(s) may be taken, such as provisioning or launching a new private network for the node in a provider network which may use a different and non-conflicting range of private network addresses and launching or moving the node to the new private network.

As indicated at 1030, route(s) between the private network and a private network for the blockchain network in the managed blockchain service that enable the node to direct private communications to individual ones of the existing nodes in the private network of the managed blockchain service may be determined by the control plane, in some embodiments. For example, as discussed above with regard to the network load balancer, virtual traffic hub, and cross attached network interfaces and below with regard to FIGS. 11 and 12, routes for listening for or redirecting traffic received from the private network for the node to be added may be added to one or more route tables and networking devices to forward traffic to the service private network. In at least some embodiments, the networking devices may implement a substrate network for the provider network.

As indicated at 1040, networking device(s) may be caused to add the determined route(s) between the private network and the private network for the blockchain network in the managed blockchain service, in some embodiments. Various API requests or other instructions may be sent to the networking devices directly or to a management service, such as network configuration service 290, in some embodiments, to add the routes and configuring the networking devices, physical and/or virtual.

Figure 11:
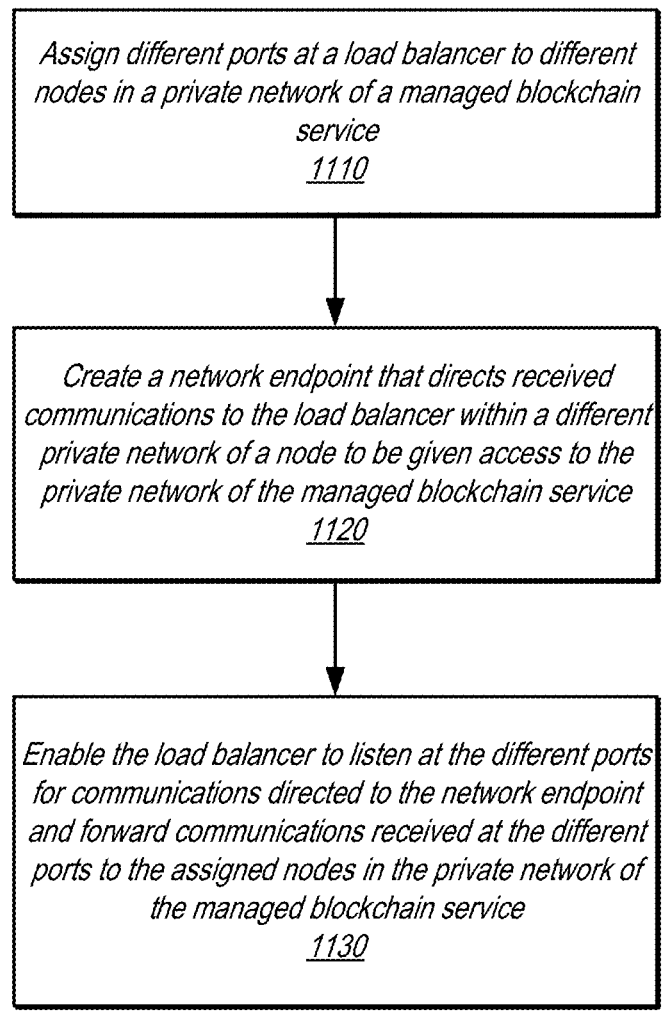
FIG. 11 is a high-level flowchart illustrating various methods and techniques to route traffic across private networks using a network endpoint and load balancer, according to some embodiments.

FIG. 11 is a high-level flowchart illustrating various methods and techniques to route traffic across private networks using a network endpoint and load balancer, according to some embodiments. As indicated at 1110, different ports at a load balancer may be assigned to different nodes in a private network of a managed blockchain service, in some embodiments. For instance, a load balancer may be implemented as virtual load balancer (e.g., implemented on one or more devices, such as servers or hardware load balancer) which may be provisioned for a private network that hosts a blockchain network. When a node is started, launched, provisioned, or otherwise created within the private network of the managed blockchain service for the blockchain network, an available port number of the load balancer may be assigned to the new node.

As indicated at 1120, a network endpoint that directs received communications to the load balancer may be created within a private network of a node to be given access to the private network of the managed blockchain service, in some embodiments. For example, one or more networking devices managed by network configuration service 290 that implement a substrate network for provider network 200 may be modified to include route(s) that will forward traffic received from within the private network of the node (as other nodes could also use the same network endpoint) to the load balancer. The network endpoint may serve as an interface via which requests directed to that endpoint can reach the specified node in the private network of the managed blockchain service. If, for instance, the network endpoint is reached using a domain name XYZ and a desired node is mapped to port 80, then a request sent to "XYZ:80" may be forwarded to the load balancer.

As indicated at 1130, the load balancer may be enabled to listen at the different ports for communications directed to the network endpoint and forward communications received at the different ports to the assigned nodes in the private network of the managed blockchain service, in some embodiments. Continuing with the example given above, the network traffic directed to port "80" may be sent to the node in the private network of the managed blockchain service assigned to port "80" by the load balancer. Other network endpoints implemented in other private networks for other nodes could also direct traffic to the same load balancer and using the same assigned ports direct traffic to specific nodes within the private network of the managed blockchain service, in some embodiments.

Figure 12:
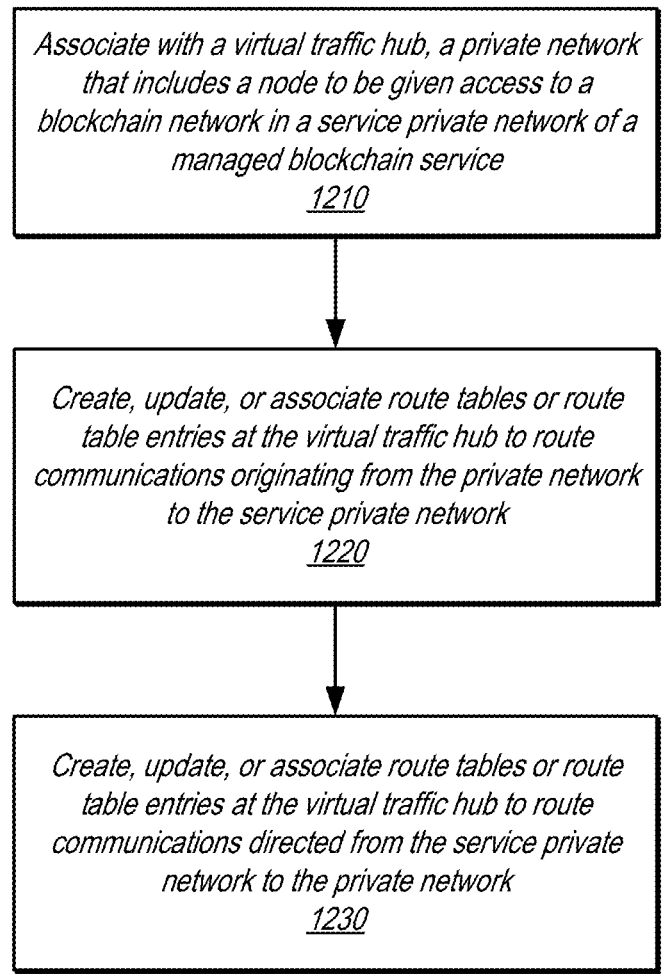
FIG. 12 is a high-level flowchart illustrating various methods and techniques route traffic across private networks using a virtual traffic hub, according to some embodiments.

FIG. 12 is a high-level flowchart illustrating various methods and techniques route traffic across private networks using a virtual traffic hub, according to some embodiments. As indicated at 1210, a private network that includes a node to be given access to a blockchain network in a service private network of a managed blockchain service may be associated with a virtual traffic hub, in some embodiments. For instance, a register for the virtual traffic hub may be updated to include the private network (e.g., which may be updated to include an identifier generated from a user account identifier and identifier for the private network). The association may allow the virtual traffic hub to utilize the correct routing tables and routing information when handling traffic from the private network of the node or bound to the private network of a node.

As indicated at 1220, route tables, route table entries, route domains, or other routing information may be created, updated, or associated at the virtual traffic hub to route communications originating from the private network to the service private network, in some embodiments. For instance, the private network address values may be identified as within a range of network addresses (e.g., a CIDR block) and included in a route table along with corresponding forwarding routes to reach different nodes within the private network of the managed blockchain service. As indicated at 1230, the same or different route tables, route table entries, route domains, or other routing information may be created, updated, or associated at the virtual traffic hub to route communications directed from the service private network to the private network, in some embodiments.

The methods described herein may in various embodiments be implemented by any combination of hardware and software. For example, in one embodiment, the methods may be implemented by a computer system (e.g., a computer system as in FIG. 13) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 13:
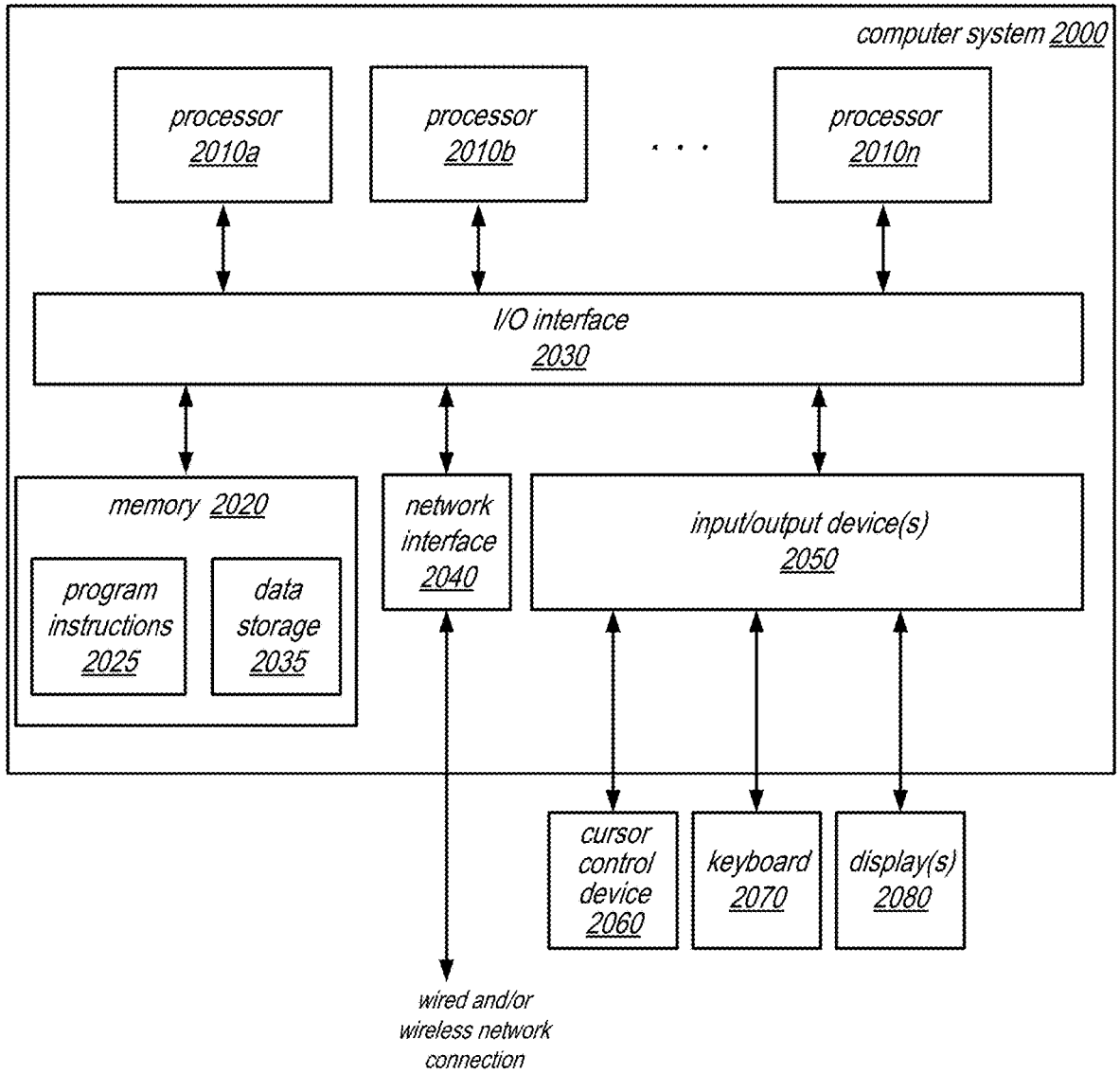
FIG. 13 illustrates an example system configured to implement the various methods, techniques, and systems described herein, according to some embodiments.

Embodiments of enabling access across private networks for a managed blockchain service as described herein may be executed on one or more computer systems, which may interact with various other devices. One such computer system is illustrated by FIG. 13. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 13, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A managed blockchain service, comprising:
a first plurality of nodes, respectively comprising at least one processor and a memory, that hosts a blockchain network in a first logically isolated private network;
a second plurality of nodes, respectively comprising at least one other processor and another memory, that implements a control plane for the managed blockchain service;
the control plane configured to:
receive, via an interface for the control plane, a request to enable a node hosted in a second logically isolated private network to communicate with the existing blockchain network in the first logically isolated private network;
after determining that the request to enable the node is valid based on a network configuration of the node:
identify one or more routes between the second logically isolated private network and the first logically isolated private network that enable the node in the second logically isolated private network to direct private communications to individual ones of the first plurality of nodes in the first logically isolated private network; and
send requests to cause one or more networking devices to add the identified one or more routes between the second logically isolated private network and the first logically isolated private network.

2. The managed blockchain service of claim 1, wherein to send the requests to cause the one or more networking devices to add the identified one or more routes between the second logically isolated private network and the first logically isolated private network, the control plane is configured to enable a load balancer in the first logically isolated private network of the managed blockchain service to:
listen at a plurality of ports for communications directed to a network endpoint created within the second logically isolated private network that hosts the node; and
forward the communications received at the plurality of ports to the individual ones of the first plurality of nodes individually assigned to different ones of the plurality of ports.

3. The managed blockchain service of claim 1, wherein to send the requests to cause the one or more networking devices to add the identified one or more routes between the second logically isolated private network and the first logically isolated private network, the control plane is configured to:
cause a virtual traffic hub to include the one or more routes to route communications originating from the second logically isolated private network to the first logically isolated private network of the managed blockchain service and to route communications directed to the second logically isolated private network from the first logically isolated private network of the managed blockchain service.

4. The managed blockchain service of claim 1, wherein the managed blockchain service is implemented as part of a provider network, wherein the blockchain network was created responsive to a request associated with a first user account of the provider network, and wherein the node and the second logically isolated private network are associated with a second user account of the provider network.

5. A method, comprising:
receiving, via an interface for a control plane of a managed blockchain service, a request to enable a node hosted in a private network to communicate with an existing blockchain network comprising one or more nodes that are hosted in the managed blockchain service;
after determining, by the control plane, that the request to enable the node is valid based on a network configuration of the node:
determining, by the control plane, one or more routes between the private network and another private network for the blockchain network in the managed blockchain service that enable the node in the private network to direct private communications to individual ones of the nodes in the other private network of the managed blockchain service; and
causing, by the control plane, one or more networking devices to add the determined one or more routes between the private network and the other private network for the blockchain network in the managed blockchain service.

6. The method of claim 5, wherein causing the one or more networking devices to add the determined one or more routes, comprises:
enabling a load balancer in the private network of the managed blockchain service to:
listen at a plurality of ports for communications directed to a network endpoint created within the private network that hosts the node; and
forward the communications received at the plurality of ports to the individual ones of the nodes individually assigned to different ones of the plurality of ports.

7. The method of claim 6, wherein the node is an application node that sends one or more requests to the nodes of the blockchain network according to one or more (Application Programming Interfaces) (APIs).

8. The method of claim 5, wherein causing the one or more networking devices to add the determined one or more routes, comprises:

causing a virtual traffic hub to include the one or more routes to route communications originating from the private network to the other private network of the managed blockchain service and to route communications directed to the private network from the other private network of the managed blockchain service.

9. The method of claim 8, wherein the node is a peer node that sends one or more communications according to a gossip protocol for the blockchain network.

10. The method of claim 8, wherein the virtual traffic hub includes another one or more routes to route communications originating from a third private network to the other private network of the managed blockchain service and to route communications directed to the third private network from the other private network of the managed blockchain service.

11. The method of claim 5, wherein the method further comprises:

receiving, via the interface for the control plane, a request to enable a second node hosted in a third private network to communicate with the blockchain network;

determining, by the control plane, that a private network address for the second node conflicts with an existing private network address in the other private network of the managed blockchain service; and responsive to determining that the private network address for the second node conflicts with the existing private network address, denying the request to enable the second node to communicate with the blockchain network.

12. The method of claim 11, further comprising: further responsive to determining that the private network address for the second node conflicts with the existing private network address, providing a range of private network addresses that do not conflict with the existing private network address in the other private network of the managed blockchain service.

13. The method of claim 5, wherein the managed blockchain service is implemented as part of a provider network, wherein the private network that hosts the node is an on premise network external to the provider network, and wherein the private communications from the node are sent via a virtual private network (VPN) connection between the on-premise network and the provider network.

14. One or more non-transitory, computer-readable storage media, storing program instructions that when executed on or across one or more computing devices cause the one or more computing devices to implement:

receiving, via an interface for a control plane of a managed blockchain service, a request to enable a node hosted in a private network to communicate with an existing blockchain network comprising one or more nodes that are hosted in the managed blockchain service;

after determining, by the control plane, that the request to enable the node is valid based on a network configuration of the node:

identifying, by the control plane, one or more routes between the private network and another private network for the blockchain network in the managed blockchain service that enable the node in the private network to direct private communications to individual ones of the nodes in the other private network of the managed blockchain service; and causing, by the control plane, one or more networking devices to add the determined one or more routes between the private network and the other private network for the blockchain network in the managed blockchain service.

15. The one or more non-transitory, computer-readable storage media of claim 14, wherein, in causing the one or more networking devices to add the determined one or more routes, the one or more non-transitory, computer- readable storage media comprise further instructions that further cause the one or more computing devices to implement:

enabling a load balancer in the private network of the managed blockchain service to:

listen at a plurality of ports for communications directed to a network endpoint created within the private network that hosts the node; and forward the communications received at the plurality of ports to the individual ones of the nodes individually assigned to different ones of the plurality of ports.

16. The one or more non-transitory, computer-readable storage media of claim 14, wherein, in causing the one or more networking devices to add the determined one or more routes, the one or more non-transitory, computer-readable storage media comprise further instructions that further cause the one or more computing devices to implement:

causing a virtual traffic hub to include the one or more routes to route communications originating from the private network to the other private network of the managed blockchain service and to route communications directed to the private network from the private network of the managed blockchain service.

17. The one or more non-transitory, computer-readable storage media of claim 14, wherein the node is a peer node that sends one or more communications according to a gossip protocol for the blockchain network.

18. The one or more non-transitory, computer-readable storage media of claim 14, wherein the one or more non-transitory, computer-readable storage media comprise further instructions that further cause the one or more computing to implement:

determining, by the control plane, that a private network address for the node does not conflict with an existing private network address in the other private network of the managed blockchain service before causing the one or more networking devices to add the determined one or more routes.

19. The one or more non-transitory, computer-readable storage media of claim 14, wherein the node is both an application node and a peer node.

20. The one or more non-transitory, computer-readable storage media of claim 14, wherein the managed blockchain service is implemented as part of a provider network, wherein the private network that hosts the node is hosted within a second provider network external to the provider network, and wherein the private communications from the node are sent via a virtual private network (VPN) connection between the on-premise network and the provider network.

\* \* \* \* \*